(12) United States Patent
Muske (10) Patent No.: US 11,579,851 B2
(45) Date of Patent: Feb. 14, 2023

(54) METHOD AND SYSTEM FOR IDENTIFICATION OF REDUNDANT FUNCTION-LEVEL SLICING CALLS

(71) Applicant: Tata Consultancy Services Limited, Mumbai (IN)

(72) Inventor: Tukaram Bhagwat Muske, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 17/479,435

(22) Filed: Sep. 20, 2021

(65) Prior Publication Data

US 2022/0091828 A1 Mar. 24, 2022

(30) Foreign Application Priority Data

Sep. 22, 2020 (IN) .............................. 202021041072

(51) Int. Cl.
*G06F 8/40* (2018.01)
*G06F 8/41* (2018.01)

(52) U.S. Cl.
CPC ...................................... *G06F 8/41* (2013.01)

(58) Field of Classification Search
CPC ....................................................... G06F 8/41
See application file for complete search history.

(56) References Cited

U.S. PATENT DOCUMENTS

| 8,495,606 B2* | 7/2013 | Lobo ...................... G06F 8/443 717/160 |
| 10,002,064 B2* | 6/2018 | Muske ................ G06F 11/3608 |
| 2011/0055803 A1* | 3/2011 | Abadi ................. G06F 11/3612 717/106 |

(Continued)

FOREIGN PATENT DOCUMENTS

CN 112699377 A 4/2021

OTHER PUBLICATIONS

M. Talukder, S. Islam and P. Falcarin, "Analysis of Obfuscated Code with Program Slicing," 2019 International Conference on Cyber Security and Protection of Digital Services (Cyber Security), 2019, pp. 1-7, doi: 10.1109/CyberSecPODS.2019.8885094. (Year: 2019).*

(Continued)

*Primary Examiner* — Zhanh Thi-Minh Bui
(74) *Attorney, Agent, or Firm* — Finnegan, Henderson, Farabow, Garrett & Dunner, LLP (57) ABSTRACT

This disclosure relates generally to the field of source code processing, and, more particularly to a method and system for identification of redundant function-level slicing calls. The method disclosed generates program dependence graphs (PDGs) based on a slicing criteria and a function corresponding to the function-level slicing call. Further the method classifies the function-level slicing call into redundant or non-redundant by traversing the PDGs and checking if a predefined condition is satisfied or not. The function-level slicing calls are classified as redundant if the check is not satisfied and are classified as non-redundant if the check is satisfied. The disclosed method can be used in identifying redundant function-level slicing calls in applications such as automated false positive elimination (AFPE), automated test case generation and so on.

13 Claims, 4 Drawing Sheets

(56) References Cited

U.S. PATENT DOCUMENTS

2013/0326472 A1* 12/2013 Han .................... G06F 30/3323
717/105
2014/0229922 A1* 8/2014 Valdiviezo Basauri .. G06F 8/41
717/126

OTHER PUBLICATIONS

Muske et al., "Efficient Elimination of False Positives Using Bounded Model Checking," (2013).

* cited by examiner

METHOD AND SYSTEM FOR IDENTIFICATION OF REDUNDANT FUNCTION-LEVEL SLICING CALLS

PRIORITY CLAIM

This US patent application claims priority under 35 U.S.C. § 119 to Indian provisional application no. 202021041072, filed on Sep. 22, 2020. The entire contents of the aforementioned application are incorporated herein by reference.

TECHNICAL FIELD

The disclosure herein generally relates to the field of source code processing, and, more particularly, to a method and system for identification of redundant function-level slicing calls for source code processing.

BACKGROUND

Static analysis tools are used to detect common programming errors in a source code without executing the source code. However, the tools generate a large number of alarms that are warning messages notifying the tool-user about potential errors such as array index out of bounds or division by zero. A high percentage of these alarms are falsely reported (also called false positives). Partitioning the alarms into false positives and true errors requires a manual inspection which is known to be costly, tedious, and error prone. To automatically reduce the number of false positives, more precise techniques have been proposed, which postprocess alarms using model checking. In the model checking-based automated false positive elimination (AFPE), initially assertions are generated corresponding to the alarms and the assertions are verified using model checking tools called as model checkers. Further based on the verification results, the alarms are identified and eliminated as false positives.

On larger systems a combination of techniques, such as application-level slicing, verification using incremental context expansion, function/verification context-level slicing (slicing the code before each call to the model checker for verifications of the assertions, wherein the entry point of the code to be sliced is same as the entry-point of the code to be verified by the model checker), is used to scale the model checker. As a result of combination of these techniques, AFPE results in a large number of calls to the slicer and the model checker. Furthermore, each call to the slicer (slicing call) and each call to the model checker (model checking call) take a considerable amount of time. As a result, applying AFPE techniques to alarms becomes time consuming and ultimately renders them to be unsuitable for post-processing alarms generated on large systems.

The function-level slicing is also used in automated test data generation, wherein assertions are generated in the code based on the coverage criteria, and incremental approach is used to verify those assertions for generating the test data. Before each verification call to the model checker, the code to be verified is generally sliced using function-level slicing to reduce the state space and scale the model checker on very large systems. As a result, the automated test data generation also involves making a large number of function-level slicing calls, making the overall test data generation time-consuming.

Code slicing is also used in several other applications, which do not require processing the code using model checking, but the code size reduction is for simplifying the code in different activities like debugging and program understanding, wherein a code is reduced in its size with respect to the error or point of interest (POI) and then debugged/understood. Henceforth, we use "code processing" to refer to all those code analysis activities wherein code slicing is used with or without model checking, e.g., AFPE, automated test data generation, debugging, and program understanding. In the processing like AFPE and automated test data generation, the code processing is based on automated code processing tools such as model checkers, and in the processing like debugging and program understanding, the code processing can be by humans or automated tools or both. In general, a source code during such processing needs to be sliced with respect to a large number of POIs and generating slices separately for each POI or group of related or similar POIs. Moreover, each slicing call is known to take considerable time, and hence overall code slicing is a time-consuming process. Henceforth, the process of code processing and usage of code slicing in it is described mainly by referring to AFPE.

SUMMARY

Embodiments of the present disclosure present technological improvements as solutions to one or more of the above-mentioned technical problems recognized by the inventors in conventional systems.

For example, in one embodiment, a method for identification of redundant function-level slicing calls is provided. The method includes: receiving one or more source codes as input for identification of redundant function-level slicing calls, wherein the one or more source codes comprises one or more functions, wherein the one or more functions comprises one or more points of interest (POIs); identifying one or more slicing criteria corresponding to each of the one or more POIs by processing the one or more POIs in the one or more functions; identifying a first set of function-level slicing calls by processing the one or more source codes based on the one or more slicing criteria for generating a set of code slices, wherein each function-level slicing call in the first set of function-level slicing calls corresponds to (i) the one or more slicing criteria and (ii) a function among the one or more functions; generating one or more program dependence graphs (PDGs) based on the one or more slicing criteria and the function corresponding to each of the function-level slicing call in the first set of function-level slicing calls, wherein the one or more PDGs include data and control dependencies that can impact values of variables in the one or more slicing criteria; and classifying using the generated one or more PDGs, each of the function-level slicing call in the first set of function-level slicing calls as one of (i) redundant or (ii) non-redundant.

In another aspect, a system for identification of redundant function-level slicing calls is provided. The system comprises memory storing instructions; one or more communication interfaces; and one or more hardware processors coupled to the memory via the one or more communication interfaces, wherein the one or more hardware processors are configured by the instructions to receive one or more source codes as input for identification of redundant function-level slicing calls, wherein the one or more source codes comprises one or more functions, wherein the one or more functions comprises one or more points of interest (POIs); identify one or more slicing criteria corresponding to each of the one or more POIs by processing the one or more POIs in the one or more functions; identify a first set of function-level slicing calls by processing the one or more source codes based on the one or more slicing criteria for generating a set of code slices, wherein each function-level slicing call in the first set of function-level slicing calls corresponds to (i) the one or more slicing criteria and (ii) a function among the one or more functions; generate one or more program dependence graphs (PDGs) based on the one or more slicing criteria and the function corresponding to each of the function-level slicing call in the first set of function-level slicing calls, wherein the one or more PDGs include data and control dependencies that can impact values of variables in the one or more slicing criteria; and classify using the generated one or more PDGs, each of the function-level slicing call in the first set of function-level slicing calls as one of (i) redundant or (ii) non-redundant.

In an embodiment, wherein generating a code slice in the set of code slices using a function-level slicing call comprises removing a set of program statements directly or indirectly belonging to the function associated with the function-level slicing call based on the one or more slicing criteria corresponding to the function-level slicing call, wherein removing the set of program statements does not affect values of variables in the one or more slicing criteria.

In an embodiment, wherein the step of classifying a function-level slicing call in the first set of function-level slicing calls as one of (i) redundant or (ii) non-redundant using the one or more PDGs comprises, traversing the data and control dependencies of the variables in the one or more slicing criteria corresponding to the function-level slicing call; checking if a predefined condition is satisfied for the function corresponding to the function-level slicing call; and classifying the function-level slicing call into any one of (i) redundant if the check is not satisfied or (ii) non-redundant if the check is satisfied.

In an embodiment, wherein checking the predefined condition for a function comprises checking whether at least one assignment included directly or indirectly in the function is a data dependency of only variables used in a set of caller functions of the function.

In an embodiment, further comprises a set of caller functions, wherein the set of caller functions of a function comprises functions that directly or indirectly call the function.

In an embodiment, further comprises slicing the one or more source codes based on the non-redundant function-level slicing calls to obtain a set of source codes for processing of the one or more source codes.

In yet another aspect, there are provided one or more non-transitory machine readable information storage mediums comprising one or more instructions which when executed by one or more hardware processors causes at least one of: receiving one or more source codes as input for identification of redundant function-level slicing calls, wherein the one or more source codes comprises one or more functions, wherein the one or more functions comprises one or more points of interest (POIs); identifying one or more slicing criteria corresponding to each of the one or more POIs by processing the one or more POIs in the one or more functions; identifying a first set of function-level slicing calls by processing the one or more source codes based on the one or more slicing criteria for generating a set of code slices, wherein each function-level slicing call in the first set of function-level slicing calls corresponds to (i) the one or more slicing criteria and (ii) a function among the one or more functions; generating one or more program dependence graphs (PDGs) based on the one or more slicing criteria and the function corresponding to each of the function-level slicing call in the first set of function-level slicing calls, wherein the one or more PDGs include data and control dependencies that can impact values of variables in the one or more slicing criteria; and classifying using the generated one or more PDGs, each of the function-level slicing call in the first set of function-level slicing calls as one of (i) redundant or (ii) non-redundant.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments herein provide a method and system for identification of redundant function-level slicing calls. The method disclosed herein identifies redundant function-level slicing calls for source code processing, wherein a redundant call relates to a slicing call that does not reduce size of a source code. In other words, the redundant slicing calls do not remove any code from the given input code, wherein the code to be removed is irrelevant to point of interests (POIs) or assertions in the given input code. The disclosed method automatically identifies function-level slicing calls that are redundant and skips those calls to reduce the time taken during source code processing in which the function-level slicing is used. The disclosed method is used to identify redundant function-level slicing calls in many code analysis activities such as automated test data generation, automated false positive elimination (AFPE), debugging, program understanding, and so on. The embodiments herein of the disclosed method are further explained in the context of AFPE. The method determines whether the function-level slicing call results in removing/pruning the source code from the entry-point function input to the slicing. If the function-level slicing call removes/prunes some source code, then the slicing call is useful or non-redundant. Otherwise, the slicing call is redundant. The method to identify redundant function-level slicing calls is based on observation that, when a combination of application-level slicing and function-level slicing is used, a function-level slicing call with a function $f$ as entry-point is useful (non-redundant) only if at least one assignment in the function $f$ or the functions directly or indirectly called by f is a data dependency of only the variables used in the callers of the function $f$.

In an embodiment, the source code is processed in the context of one or more functions either automatically or manually or in combinations of both, wherein each function can be any intermediate function in an application code or the application entry-point/function. Slicing is generally used to reduce the size of the source code to be processed in the context of some function, by removing the code that belongs to the function directly or indirectly and is irrelevant to the POIs/assertions being checked in the source code. Such slicing calls are referred as function-level slicing calls. Since the function provided as entry-point to function-level slicing is same as the entry-point function to the code verification by the corresponding model checking call, the entry-point function is also referred to as "verification context". Therefore, a function and a verification context and even a context can be referred to interchangeably.

Static analysis tools help to detect common programming errors in software systems and even to ensure that the systems are free of such defects. These tools generate large number of false positives. In general, it is studied that there are 40 alarms for every thousand lines of code, and 35% to 91% of alarms are false positives. Partitioning alarms into false positives and errors requires manual inspection which is tedious, and time-consuming. Moreover, the manual inspection of alarms even can be error-prone. To reduce the number of false positives reported and thus the cost of manual inspection, postprocessing of alarms using a model checker has been proposed. In this postprocessing, (a) an assertion is generated corresponding to each alarm such that the assertion holds if and only if the alarm is a false positive; (b) the assertion is verified using a model checker; and (c) the alarm is eliminated as a false positive if the verification concludes that the assertion holds.

In very large systems, verification using model checkers are known to fail. To address this, several techniques have been proposed during AFPE. These techniques include verification using incremental context expansion (VerICE), function-level slicing (slicing the code before each model checking call in its verification context) and grouping of related assertions. Although the combination of these techniques helps to scale up AFPE to large systems, it considerably increases the number of calls made to a slicer and model checker. Due to the large number of slicing and model checking calls made during AFPE and each call taking considerable amount of time, applying AFPE to alarms becomes time-consuming. The disclosed method reduces time taken by AFPE by identifying redundant calls to the slicer and skipping those redundant calls. The method is designed based on data dependencies. Furthermore, the disclosed method also reduces time taken during code processing wherein function-level slicing is used, for example, in automated test data generation and debugging, by identifying redundant calls to the slicer.

The existing techniques used for scalability of AFPE are described further below with suitable examples. Moreover, the examples illustrate function-level slicing calls and multiple such calls for a single or a group of related POIs/assertions. Consider the source code example shown below to illustrate need of combination of multiple techniques for scalable AFPE.

Example Source Code 1:

```
1   int t, x, y, z;                21   void f2(int p) {
2   void main ()                   22      int i, j;
3   x=lib1( ); y=lib2( );          23
4   f1( );                         24      i = p %5;
5   }                              25      j = lib4( ) % 5;
6                                  26      y =complexFunc (5),
7   void f1( ) {                   27
8      int i = 0;                  28      f3 (i, j)
9      while (i++ < x) }           29   }
10        if (y == z) {            30
11           f2(i);                31   void f3(int i, int j) {
12           f4( );                32      int arr[5]={4, 2, 3, 9, 0};
13        }                        33      int k = 2;
14     }                           34
15  }                              35      if (i != j)
16                                 36         k = arr[i] - arr[j];
17  void f4( ) {                   37
18     t = complexFunc(0);         38      //assert(k!=0);
19     z = lib4( );                39      t = 100/k; D39
20     if (z == 4) {               40   }
21        //assert (x! =0);        41
22        display(1/x); D22        42   int complexFunc(int r){
23     }                           43   ...//icomplex code
24  }                              44   }
```

The above example source code shows two division by zero alarms, D22 and D39, of which D39 is a false positive, because the values of k at line 39 are non-zero. The assertions generated corresponding to these alarms for AFPE are respectively shown on lines 21 and 38. As the assertions are in different functions, they are not grouped together by the assertions grouping techniques. For illustration purpose, it is assumed that the function complexFunc is complex, and verification of a code that contains this function, using a model checker, times out, i.e., given a sufficiently large time limit, the verification cannot conclude whether the assertion holds or fails. mcall ($\phi$, f) is used to denote a call to the model checker, which verifies the assertion generated corresponding to an alarm $\phi$, and in the context of given function $f$, that is, $f$ is taken as the entry function for the verification so that the code included in function $f$ and the functions directly or indirectly called by $f$ are analyzed during the verification. This function $f$ is called as verification context. On similar lines, scall ($\phi,f$) is used to denote a call to the slicer, which slices the code in function $f$ and the functions directly or indirectly called by $f$ with respect to the assertion generated corresponding to an alarm $\phi$, assuming $f$ as the entry-function. $S_{\phi,f}$ is used to denote the slice resulting from scall ($\phi$, $f$), and $S_{\phi,App}$ to denote the slice generated when $f$ is the entry function of the application code. The code in a function g represents the code belonging to function g and the functions that are directly or indirectly called by g.

In AFPE, to use a model checker in a more scalable way, verification of assertions is performed using an approach called incremental context expansion (VerICE). Verification of each assertion (or a group of related/similar assertions) is started from the function that includes the assertion(s). Then the verification context is expanded to its callers until the assertion is proven to hold, a verification call times-out or runs out-of-memory, or the last verified context is the application's entry-function. During AFPE with VerICE, processing of D39 results in two model checking calls, first mcall (D39,$f3$) and then mcall (D39, $f2$), without eliminating the alarm as a false positive. The first call results in a counter-example (i.e., shows that the assertion fails), while the second call times out, because the function complexFunc is a part of f2. As the second model checking call times out, the context expansion is stopped and the assertion is not processed further: it is not then verified in any other verification context.

During AFPE, to remove such complex code from code to be verified by the model checker, backward slicing is used. For each assertion or a group of related assertions, the complete application code is sliced with respect to the assertion(s) or the alarm program points and expressions as POIs, and then the assertions in the sliced code are verified. However, usage of slicing at the application level may not always help. For example, during AFPE with VerICE and application-level slicing, processing of D39, still results in the same two model checking calls, generating the same results. It is because the function complexFunc is still a part of $f2$ in the application-level slice, i.e., the slice $S_{39,App}$ generated from scall (D39, main). AFPE with those two techniques also does not eliminate the false positive, D39.

To address this problem, function-level slicing, also called as verification context-level slicing, is used. That is, before each model checking call, the code included in the verification context of the call, denoted by a function, is sliced further. In other words, in this technique, before each model checking call mcall ($\phi,f$), the code to be verified is sliced further using scall ($\phi, f$) and the function/context-level slice thus generated is verified using the model checker. For example, during AFPE with VerICE and function-level slicing, D39 gets eliminated as a false positive. In this case, the second model checking call, mcall (D39, $f2$), proves that the assertion holds, because the function-level slice generated, $S_{D39,f2}$ does not include the complex function. This example indicates that the function-level slicing helps to identify and eliminate more false positives. This technique is being commonly used in code processing where slicing is useful, like automated elimination of false positives, automated test data generation, and debugging.

To speed up function-level slicing, the application code may be sliced at the application-level for each alarm/group of alarms, and then the assertions in each slice are verified using VerICE and function-level slicing. Moreover, generating the application level slice first also can be a requirement when other techniques are used, e.g., abstraction of unbounded loops based on the assertion(s). During AFPE with this combination of techniques, processing of D39 results in three slicing calls and two model checking calls: scall (D39, main), scall (D39, $f3$), mcall (D39, $f3$), scall (D39, $f2$) and mcall (D39,$f2$). Processing of D22 results in three slicing calls and three model checking calls: scall (D22,main), scall (D22,$f4$), mcall (D22,$f4$), scall (D22,$f1$), mcall (D22,$f1$), mcall (D22,main). This indicates that the combination of techniques during AFPE increases the number of slicing and model checking calls.

The goal of function-level slicing, i.e., any scall ($\phi,f$), is to remove any (complex) code that belongs to $f$ in $S_{\phi,App}$ and does not impact the result of mcall ($\phi, f$). For example, the second function-level slicing call for D39 shown in the example source code 1, scall (D39,$f2$), removes the function complexFunc from $f2$ present in $S_{D39,App}$. This code removal allows to eliminate the alarm as a false positive through mcall (D39, $f2$). Note that, a function-level slicing call may not always result in such code removal, e.g., scall (D39,$f3$), does not remove any code from $f3$ present in $S_{D39,App}$. Moreover, the two function-level slicing calls for D22, scall (D22, $f4$), and scall (D22, $f1$), also do not remove any code respectively from $f4$ and $f1$ present in $S_{D22,App}$. That is, among those total four function-level slicing calls, three are redundant, and they can be skipped to reduce the AFPE time.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

Figure 1:
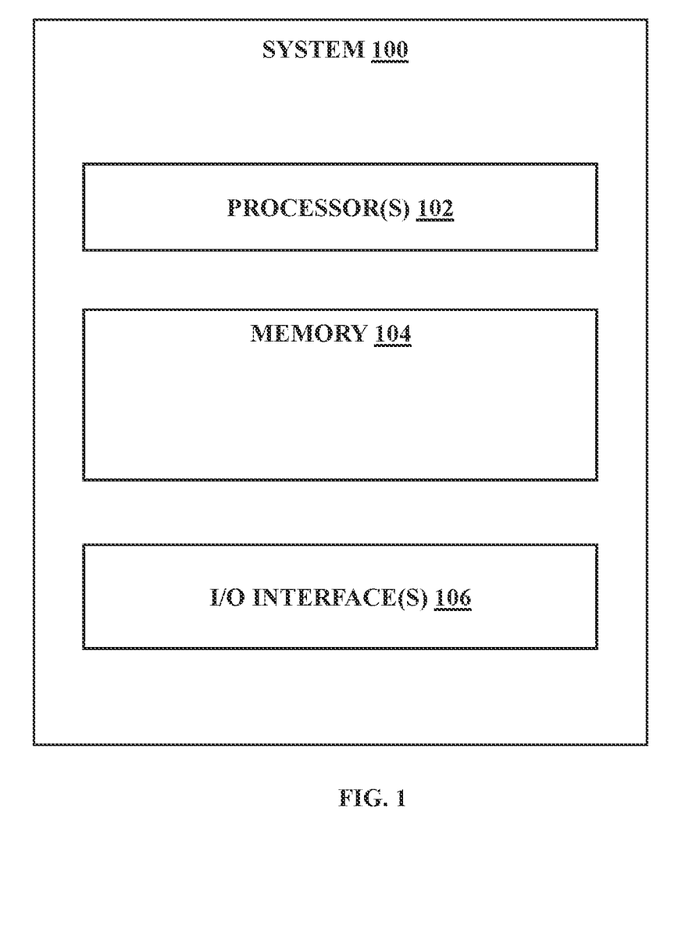
FIG. 1 illustrates an exemplary block diagram of a system for identification of redundant function-level slicing calls, in accordance with some embodiments of the present disclosure

FIG. 1 illustrates a system 100 for identifying redundant function-level slicing calls, according to some embodiments of the present disclosure. In an embodiment, the system 100 includes one or more processors 102, communication interface device(s) or input/output (I/O) interface(s) 106, and one or more data storage devices or memory 104 operatively coupled to the one or more processors 102. The one or more processors 102 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface (s) 106 may include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a module for identifying redundant function-level slicing calls of the system 100 along with a plurality of modules (not shown) to perform the methodology described herein.

Figure 2:
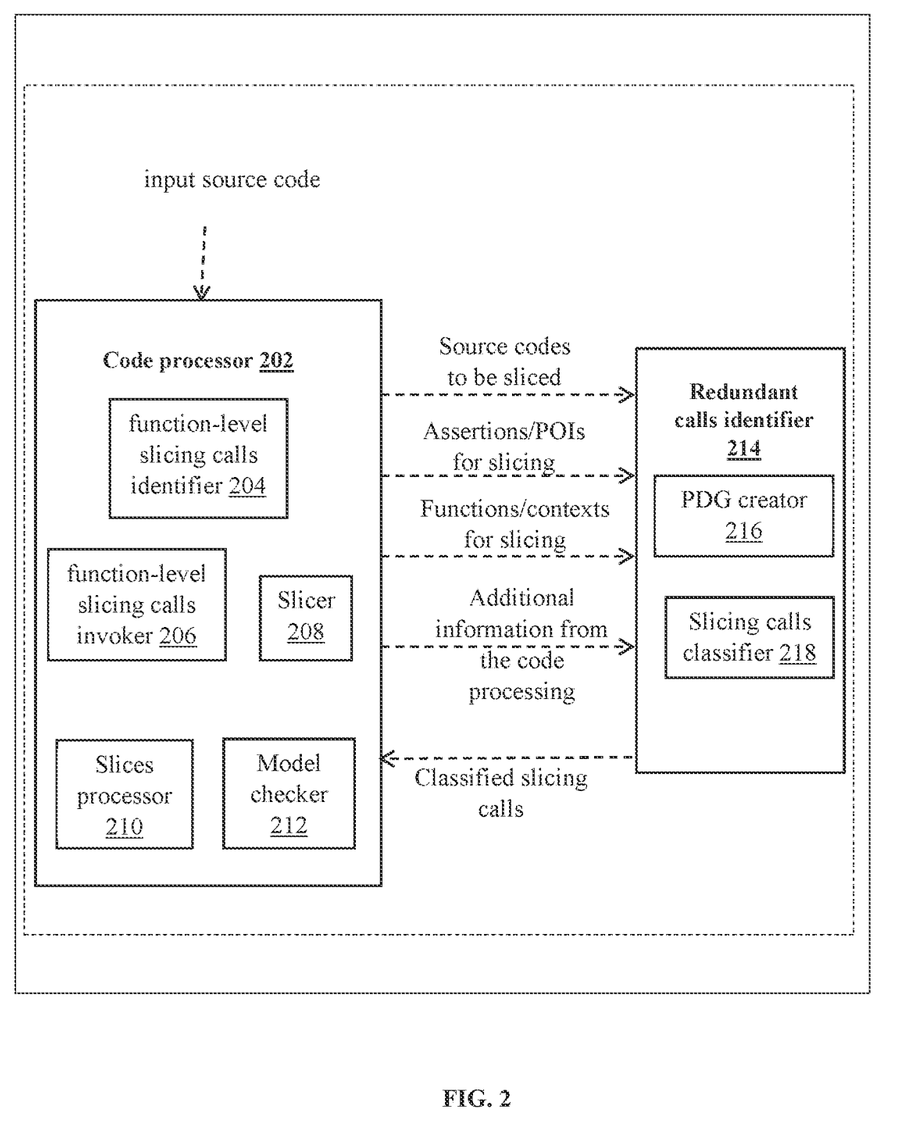
FIG. 2 is afunctional block diagram of the system for identification of redundant function-level slicing calls according to some embodiments of the present disclosure.

FIG. 2 is a functional block diagram of the system 100 for identification of redundant function-level slicing calls according to some embodiments of the present disclosure. The functional block diagram comprises two modules, a code processor 202 and a redundant calls identifier 214. The code processor 202 further comprises a function-level slicing calls identifier 204, a function-level slicing calls invoker 206, a slicer 208, a slices processor 210, and a model checker 212 for source code processing. The redundant calls identifier 214 further comprises a program dependence graph (PDG) creator 216 and a slicing calls classifier 218 for identifying redundant function-level calls.

Figure 3:
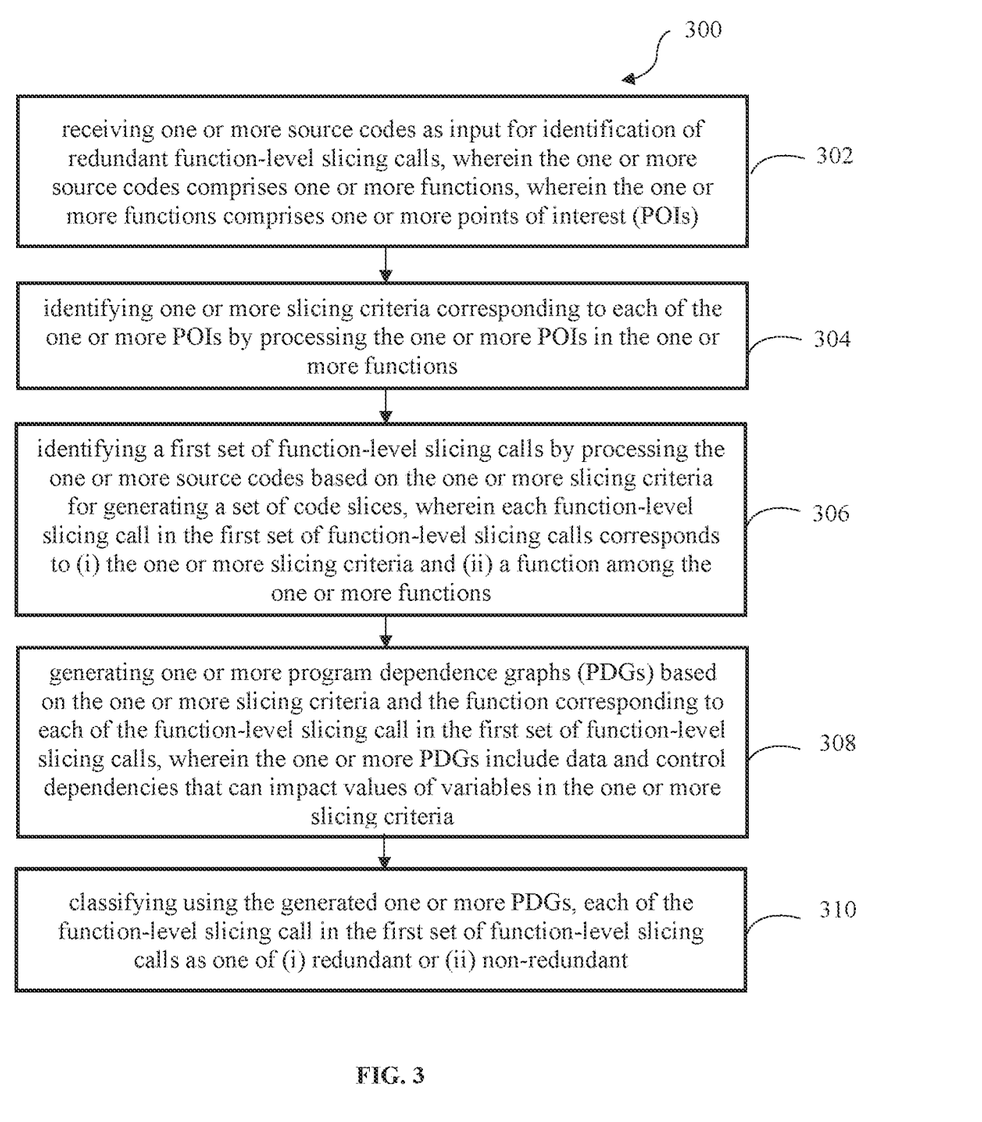
FIG. 3 is an exemplary flow diagram for a method for identification of redundant function-level slicing calls according to some embodiments of the present disclosure.
Figure 4:
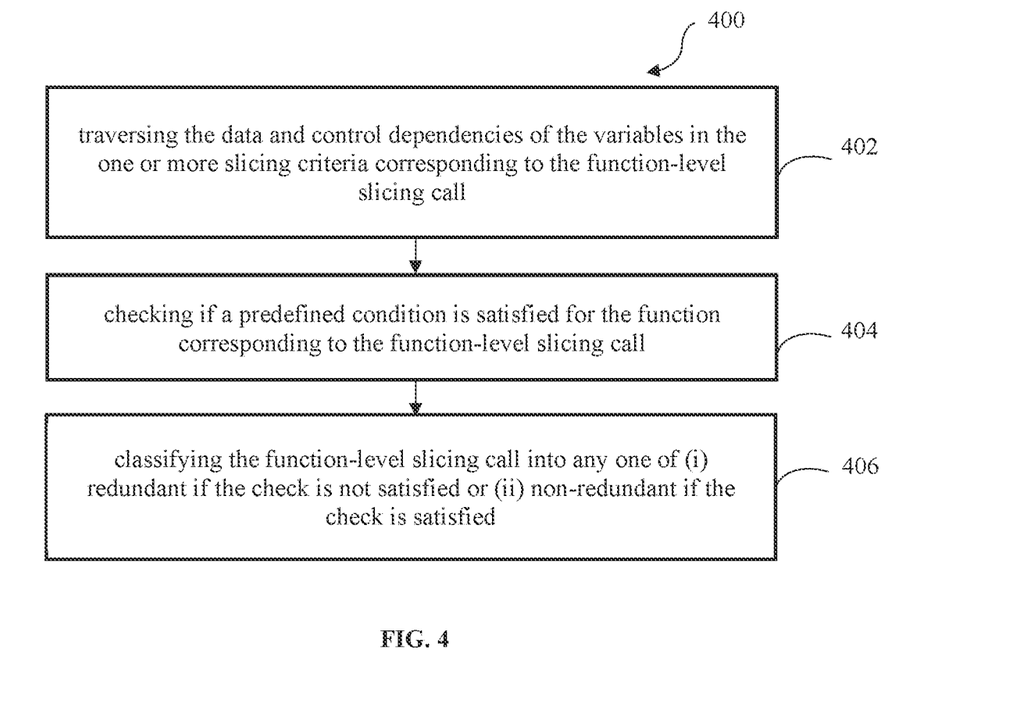
FIG. 4 is an exemplary flow diagram for a method for classifying a function-level slicing call into redundant or non-redundant according to some embodiments of the present disclosure.

FIG. 3 is an exemplary flow diagram for a method 300 for identification of redundant function-level slicing calls according to some embodiments of the present disclosure. The different steps involved in the identification of redundant function-level slicing calls are depicted in FIG. 3 through FIG. 4. The steps of the method 300 and the method 400 of the present disclosure will now be explained with reference to the components of the system 100 as depicted in FIG. 1 and the modules and components 202-218 as depicted in FIG. 2.

In an embodiment of the present disclosure, the one or more processors 102 are configured to receive at step 302, one or more source codes as input for identification of redundant function-level slicing calls, wherein the one or more source codes comprise one or more functions, wherein the one or more functions comprise one or more points of interest (POIs). The one or more source codes are provided to the code processor 202 for code processing. The code processor 202 corresponds to processing of the one or more source codes using one or more automated tools. For example, during AFPE, the code processor 202 corresponds to analyzing the sources codes using static analysis tools, generating assertions corresponding to resulting static analysis alarms, and applying different AFPE techniques to eliminate false positives by verifying the assertions using model checkers. Moreover, for automated test data generation, the code processor 202 corresponds to generation of test data for a given code coverage criteria, for example, generation of test data for unit testing for coverages like statement coverage, branch coverage, and decision coverage, by generating relevant assertions and verifying them.

In an embodiment of the present disclosure, the one or more processors 102 are configured to identify at step 304, one or more slicing criteria corresponding to each of the one or more POIs by processing the one or more POIs in the one or more functions. The one or more slicing criteria are identified using the code processor 202 for code processing. For example, in AFPE and test data generation, the slicing criteria can correspond to assertions or variables associated with program points/locations.

In an embodiment of the present disclosure, the one or more processors 102 are configured to identify at step 306, a first set of function-level slicing calls by processing the one or more source codes based on the one or more slicing criteria for generating a set of code slices. Each function-level slicing call in the identified first set of function-level slicing calls corresponds to the one or more slicing criteria and a function among the one or more functions. The function-level slicing calls identifier 204 is a component of the code processor 202, that identifies the function-level slicing calls that can be made to the slicer during the code processing. The function-level slicing calls invoker 206 is a component of the code processor 202 which invokes the slicer 208 to generate the set of code slices from the one or more source codes to be processed, based on the POIs identified or slicing criteria added in the one or more source codes, and the contexts/functions in the one or more source codes. A set of program statements directly or indirectly belonging to the function associated with the function-level slicing call are removed based on the one or more slicing criteria corresponding to the function-level slicing call to generate the set of code slices. The slicer 208 reduces the size of the one or more source codes to be processed by the slices processor 210, by eliminating the set of program statements which do not affect the values of the variables present in the slicing criteria or POIs. The slices processor 210 in turn can invoke the model checker 212 or also can interact with the user during the code processing.

In an embodiment of the present disclosure, the one or more processors 102 are configured to generate at step 308, one or more program dependence graphs (PDGs) based on the one or more slicing criteria and the function corresponding to each of the function-level slicing call in the first set of function-level slicing calls. The PDGs are generated using the PDG creator 216 in the redundant calls identifier 214 module. The one or more PDGs include data and control dependencies that can impact values of variables in the one or more slicing criteria. The PDG creator 216 builds one or more PDGs of the source codes that are input to the redundant calls identifier 214. The data and control dependencies included in the source code dependencies built depends on the type of slice to be created. For example, if the slice is to be generated as backward slice, both the data and control dependencies are included in the PDG, whereas if the slice is created as thin (value) slice, only the data dependencies (data and value dependencies) are included in the PDG. The PDG building can be with respect to the slicing criteria or for the complete source code. The code processor 202 also can build one or more PDGs from the source codes which are input to it. In this case, the PDG creator 216 reuses the relevant PDGs created by the code processor 202 instead of building them again.

In an embodiment of the present disclosure, the one or more processors 102 are configured to classify at step 310, each of the function-level slicing call in the first set of function-level slicing calls as one of (i) redundant or (ii) non-redundant using the generated one or more PDGs. The redundant calls identifier 214 identifies function-level slicing calls which are redundant. The redundant calls identifier 214 identifies the function-level slicing calls which will not remove any source code from the one or more source codes given as input for the slicing. Its functionality is invoked after the possible function-level slicing calls are identified by the function-level slicing calls identifier 204. It receives the following as inputs: 1) the set of code slices 2) the slicing criteria based on the set of code slices, and 3) the function (context) in which the slicing is to be performed i.e., the function to be taken as an entry function during the slicing. 4) Additional settings that are related to the processing by the code processor 202, to improvise the identification of redundant slicing calls. The function-level slicing calls classified into redundant and useful calls by the redundant calls identifier 214 are given as input to the function-level slicing calls invoker 206, wherein the function-level slicing calls invoker 206 can skip performing the slicing corresponding for the calls that are identified as redundant. Various steps involved in classifying the function-level slicing call into redundant or non-redundant are depicted in FIG. 4. At step 402, using the PDGs constructed by the PDG creator, the slicing calls classifier traverses the data and control dependencies of the variables in the one or more slicing criteria corresponding to the function-level slicing call and checks at step 404 if a condition is satisfied for the function corresponding to the function-level slicing call. i.e., a check is done whether at least one assignment included directly or indirectly in the function (the verification context) is a data dependency of only variables used in a set of caller functions of the function. The set of caller functions of a function comprises functions that directly or indirectly call the function. Further at step 406, the function-level slicing call is classified into redundant or non-redundant. Based on whether the check is satisfied, each function-level slicing call is classified either as redundant or non-redundant (useful). If the check is not satisfied, then the function-level slicing call is classified as redundant, and if the check is satisfied, the function-level slicing call is classified as non-redundant. In an embodiment, the slicing calls classifier can use the def-use pairs to determine whether the condition is satisfied for each of the slicing calls to be classified.

Let callers($f$) denotes the set of functions that call $f$ directly or indirectly; and callees($f$) denotes the set of functions that are directly or indirectly called by $f$, inclusive of $f$. A variable v at a program point p is said to be data dependent on a definition (assignment) $d_v$ of v, if $d_v$ is a reaching definition of v at p. Data dependencies of a variable v are the definitions on which v is data dependent. A function-level slicing call scall($\phi$,$f$) removes code belonging to $f$ present in $S_{\phi,App}$ only if the following condition is satisfied: a definition in g1∈ callees($f$) is a data dependency of a variable used in h2∈ callers($f$), and the same definition is not a data dependency for any variable used in g2∈ callees($f$). That is, the call is useful (non-redundant) if the condition is satisfied. For example, in the example source code 1 scall(D39, $f$2) gets identified as useful because the condition is satisfied: the definition of y in $f$2 (at line 26) is a data dependency of y used in $f$1∈ callers($f$2) (at line 10), and the same definition is not a data dependency for any variable used in any function in callees($f$2). The condition is not satisfied for scall(D22, $f$4): the definition of z in $f$4 (at line 19) is a data dependency of z used in $f$1 ∈ callers($f$2) (at line 10), but the same definition is also a data dependency of z used in $f$4 at line 20. Thus, scall(D22,$f$4) is redundant. For scall(D39, $f$3) and scall(D22,$f$1), the condition identifies them as redundant.

To efficiently compute whether the condition is satisfied for a given function-level slicing call scall($\phi$,$f$), the PDG creator 216 can freshly construct PDGs or reuse them from PDGs constructed during the application-level slicing for the assertions performed by the code processor 202 while processing the code. Furthermore, the PDG creator 216, instead of or in addition to constructing/reusing the PDGs, computes def-use pairs or reuses def-use pairs computed during the code processing by the code processor 202 wherein a definition-use pair (def-use pair) is the association between a definition (assignment) of a variable and a use of the variable.

Further the one or more source codes are sliced by the function-level slicing calls invoker 206 based on the non-redundant function-level slicing calls to obtain a set of source codes for processing of the one or more source codes. And the set of source codes are processed by slices processor 210 in the code processor 202. The slices processor 210 processes the set of source codes generated by the function-level slicing call and the source code in redundant function-level slicing calls for the purposes like elimination of false positives or automated test data generation. The analysis by this component can be done by invoking the model checker 212 or interacting with the user.

The disclosed method automatically identifies redundant function-level slicing calls and skip those calls to reduce the time taken during the code processing in which function-level slicing is used. The method determines whether the function-level slicing call results in removing or pruning the source code. If the slicing call removes some source code from the source code input for slicing then the slicing call is useful. In other case the slicing call is redundant if the slicing call does not remove any source code from the source code input for slicing. Thus it is observed that the slicing call is useful only if at least one assignment in the verification context is a data dependency of only the variables used in the callers of the verification context.

In an embodiment, the redundant slicing calls identification by slicing calls classifier 218 can be improvised, using the additional information from the code processing, e.g., the type of code processing and so on, to identify more function-level slicing calls as redundant. In the improvisation, the identification is based on the complexity of the source code being removed. In other words, for each of the useful slicing calls identified by the slicing calls classifier 218, the slicing calls classifier furthermore checks the complexity of the source code being removed and identifies the useful slicing call as redundant if the source code being removed is not complex. The complex code identification can be based on heuristics and can involve checking presence of the code constructs that increase the code complexity, e.g., presence of unbounded loops, manipulation of large-size arrays, etc. For example, consider the function-level slicing call scall(D39,$f$2) during processing of the example source code 1 for AFPE. First, based on the condition, the slicing calls classifier identifies the slicing call as useful, because the required condition is satisfied. Then, the classifier component checks the code being removed, i.e., the call to the function complexFunc at shown at line 26 and the code in function complexFunc. If the code is not complex, e.g., it contains only simple assignment "x=y;" then it marks the call as redundant. If the code has loops, along with manipulation of large-size data structures such as arrays, linked lists, and maps, it marks the call as useful. That is, in this improvisation, the classifier may identify some function-level slicing call as redundant even if it removes some code. The slicing calls classifier can be pre-configured or configured based on the additional information received as input for the configuration purpose. The additional information may include information about the code constructs or locations that have been observed to be complex during the model checking of the code during processing of the slices by the slices processor 210. Furthermore, the slicing calls classifier can use the techniques and methods known in prior art to determine whether the code being removed due to a function-level slicing call is complex.

Since model checking calls made at the higher context/function-levels generally time out, techniques in prior art apply limit on the functions/contexts that are at high level and get processed during VerICE. The function containing the assertion(s) to be verified is counted at the first level. When the code processor 202 applies such limit, the code processor can be configured to perform intermediate-level slicing instead of the application-level slicing, wherein the intermediate-level slicing is at the level of one or more intermediate-functions identified based on the highest level of functions that are allowed to process during the context expansion. In other words, the code processor also can be configured to generate code slices for the assertions with one or more intermediate functions as entry-points, instead of the slicing the code with entry-point same as the application's entry-points. Generating slices with intermediate-functions as entry-points, instead of the application-level slicing allows for the slicing calls classifier 218 to identify more slicing calls as redundant. That is, a function-level slicing call identified as useful by the slicing calls classifier may get identified as redundant if the code processor performs intermediate-level slicing instead of the application-level slicing. Let L be the configured value in the code processor that denotes the maximum-level limit that determines which functions can be processed. The entry-points for the intermediate-level slicing can be identified as all possible functions that are at the level L. Let $F_L$ be the set of functions at level L. Therefore, for each assertion/group of related assertions, the code processor 202 can also be configured to perform application-level slicing or intermediate-level slicing with $F_L$ as the entry-points. The slices generated due to the application-level slicing or intermediate slicing are later processed during the code processing and are also provided as input (source codes to be sliced) to the redundant calls identifier.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for automatic identification of redundant function-level slicing calls for source code processing, comprising:
   receiving, via one or more hardware processors, one or more source codes as input for identification of redundant function-level slicing calls, wherein the one or more source codes comprises one or more functions, wherein the one or more functions comprises one or more points of interest (POIs), wherein the one or more POIs are one or more expressions in the one or more source codes that are analyzed by a static analysis tool during static analysis of the one or more source codes;
   identifying, via the one or more hardware processors, one or more slicing criteria corresponding to each of the one or more POIs by processing the one or more POIs in the one or more functions, wherein a slicing criteria in the one or more slicing criteria is a pair of a variable used in the expression corresponding to the POI and location of the expression in the source code;
   identifying, via the one or more hardware processors, a first set of function-level slicing calls by processing the one or more source codes based on the one or more slicing criteria for generating a set of code slices, wherein each function-level slicing call in the first set of function-level slicing calls corresponds to (i) the one or more slicing criteria and (ii) a function among the one or more functions;
   generating, via the one or more hardware processors, one or more program dependence graphs (PDGs) based on the one or more slicing criteria and the function of the one or more functions corresponding to each of the function-level slicing call in the first set of function-level slicing calls, wherein the one or more PDGs include data and control dependencies that can impact values of variables in the one or more slicing criteria;
   classifying, via the one or more hardware processors, using the generated one or more PDGs, each of the function-level slicing call in the first set of function-level slicing calls as one of (i) redundant or (ii) non-redundant, wherein the function-level slicing call is classified as non-redundant if the function-level slicing call prunes the source code, and the function-level slicing call is classified as redundant if the function-level slicing call does not prune the source code; and slicing, via the one or more hardware processors, the one or more source codes based on the non-redundant function-level slicing calls to obtain a set of source codes for processing of the one or more source codes and skipping the redundant function-level slicing calls during the slicing of the one of or more source codes;

wherein generating a code slice in the set of code slices using the function-level slicing call comprises removing a set of program statements directly or indirectly belonging to the function associated with the function-level slicing call based on the one or more slicing criteria corresponding to the function-level slicing call.

2. The processor implemented method of claim 1, wherein removing the set of program statements does not affect values of variables in the one or more slicing criteria.

3. The processor implemented method of claim 1, wherein the step of classifying a function-level slicing call in the first set of function-level slicing calls as one of (i) redundant or (ii) non-redundant using the one or more PDGs comprises,
traversing the data and control dependencies of the variables in the one or more slicing criteria corresponding to the function-level slicing call;
checking if a predefined condition is satisfied for the function corresponding to the function-level slicing call; and
classifying the function-level slicing call into any one of (i) the redundant if the check is not satisfied or (ii) the non-redundant if the check is satisfied.

4. The processor implemented method of claim 3, wherein checking the predefined condition for the function corresponding to the function-level slicing call comprises checking whether at least one assignment included directly or indirectly in the function is a data dependency of only variables used in a set of caller functions of the function.

5. The processor implemented method of claim 4, wherein a set of caller functions of the function corresponding to the function-level slicing call comprises functions that directly or indirectly call the function.

6. The processor implemented method of claim 1, further comprises verifying, using a model checker, function-level slices generated through the non-redundant function-level slicing calls to identify and eliminate false positives.

7. A system for automatic identification of redundant function-level slicing calls for source code processing, comprising:
a memory storing instructions;
one or more communication interfaces; and
one or more hardware processors coupled to the memory via the one or more communication interfaces, wherein the one or more hardware processors are configured by the instructions to:
receive one or more source codes as input for identification of redundant function-level slicing calls, wherein the one or more source codes comprises one or more functions, wherein the one or more functions comprises one or more points of interest (POIs), wherein the one or more POIs are one or more expressions in the one or more source codes that are analyzed by a static analysis tool during static analysis of the one or more source codes;
identify one or more slicing criteria corresponding to each of the one or more POIs by processing the one or more POIs in the one or more functions, wherein a slicing criteria in the one or more slicing criteria is a pair of a variable used in the expression corresponding to the POI and location of the expression in the source code;
identify a first set of function-level slicing calls by processing the one or more source codes based on the one or more slicing criteria for generating a set of code slices, wherein each function-level slicing call in the first set of function-level slicing calls corresponds to (i) the one or more slicing criteria and (ii) a function among the one or more functions;
generate one or more program dependence graphs (PDGs) based on the one or more slicing criteria and the function of the one or more functions corresponding to each of the function-level slicing call in the first set of function-level slicing calls, wherein the one or more PDGs include data and control dependencies that can impact values of variables in the one or more slicing criteria;
classify using the generated one or more PDGs, each of the function-level slicing call in the first set of function-level slicing calls as one of (i) redundant or (ii) non-redundant, wherein the function-level slicing call is classified as non-redundant if the function-level slicing call prunes the source code, and the function-level slicing call is classified as redundant if the function-level slicing call does not prune the source code; and
slicing, via the one or more hardware processors, the one or more source codes based on the non-redundant function-level slicing calls to obtain a set of source codes for processing of the one or more source codes and skipping the redundant function-level slicing calls during the slicing of the one of or more source codes;
wherein generating a code slice in the set of code slices using the function-level slicing call comprises removing a set of program statements directly or indirectly belonging to the function associated with the function-level slicing call based on the one or more slicing criteria corresponding to the function-level slicing call.

8. The system of claim 7, wherein removing the set of program statements does not affect values of variables in the one or more slicing criteria.

9. The system of claim 7, wherein the step of classifying a function-level slicing call in the first set of function-level slicing calls as one of (i) redundant or (ii) non-redundant using the one or more PDGs comprises,
traversing the data and control dependencies of the variables in the one or more slicing criteria corresponding to the function-level slicing call;
checking if a predefined condition is satisfied for the function corresponding to the function-level slicing call; and
classifying the function-level slicing call into any one of (i) the redundant if the check is not satisfied or (ii) the non-redundant if the check is satisfied.

10. The system of claim 9, wherein checking the predefined condition for the function corresponding to the function-level slicing call comprises checking whether at least one assignment included directly or indirectly in the function is a data dependency of only variables used in a set of caller functions of the function.

11. The system of claim 10, further comprises a set of caller functions, wherein the set of caller functions of the function corresponding to the function-level slicing call comprises functions that directly or indirectly call the function.

12. The system of claim 7, further comprises verifying, using a model checker, function-level slices generated through the non-redundant function-level slicing calls to identify and eliminate false positives.

13. One or more non-transitory machine readable information storage mediums for automatic identification of redundant function-level slicing calls for source code processing, comprising one or more instructions, which when executed by one or more hardware processors causes:

receiving one or more source codes as input for identification of redundant function-level slicing calls, wherein the one or more source codes comprises one or more functions, wherein the one or more functions comprises one or more points of interest (POIs), wherein the one or more POIs are one or more expressions in the one or more source codes that are analyzed by a static analysis tool during static analysis of the one or more source codes;

identifying one or more slicing criteria corresponding to each of the one or more POIs by processing the one or more POIs in the one or more functions, wherein a slicing criteria in the one or more slicing criteria is a pair of a variable used in the expression corresponding to the POI and location of the expression in the source code;

identifying a first set of function-level slicing calls by processing the one or more source codes based on the one or more slicing criteria for generating a set of code slices, wherein each function-level slicing call in the first set of function-level slicing calls corresponds to (i) the one or more slicing criteria and (ii) a function among the one or more functions;

generating one or more program dependence graphs (PDGs) based on the one or more slicing criteria and the function of the one or more functions corresponding to each of the function-level slicing call in the first set of function-level slicing calls, wherein the one or more PDGs include data and control dependencies that can impact values of variables in the one or more slicing criteria;

classifying using the generated one or more PDGs, each of the function-level slicing call in the first set of function-level slicing calls as one of (i) redundant or (ii) non-redundant, wherein the function-level slicing call is classified as non-redundant if the function-level slicing call prunes the source code, and the function-level slicing call is classified as redundant if the function-level slicing call does not prune the source code; and slicing the one or more source codes based on the non-redundant function-level slicing calls to obtain a set of source codes for processing of the one or more source codes and skipping the redundant function-level slicing calls during the slicing of the one of or more source codes;

wherein generating a code slice in the set of code slices using the function-level slicing call comprises removing a set of program statements directly or indirectly belonging to the function associated with the function-level slicing call based on the one or more slicing criteria corresponding to the function-level slicing call.

* * * * *